(12) United States Patent
Kim et al.

(10) Patent No.: US 10,475,193 B2
(45) Date of Patent: Nov. 12, 2019

(54) METHOD AND APPARATUS FOR DETERMINING DISPLACEMENT INFORMATION OF TARGET AREA AND METHOD AND APPARATUS FOR DETERMINING ATMOSPHERE INFORMATION USING THE SAME

(71) Applicant: ELECTRONICS AND TELECOMMUNICATIONS RESEARCH INSTITUTE, Daejeon (KR)

(72) Inventors: Tae Jung Kim, Daejeon (KR); Sang Il Kim, Sejong-si (KR); Hyoun Myoung Cho, Daejeon (KR); Goo Kim, Daejeon (KR); Ji In Kim, Daejeon (KR); Do Seob Ahn, Daejeon (KR); Il Gu Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 29 days.

(21) Appl. No.: 15/808,369

(22) Filed: Nov. 9, 2017

(65) Prior Publication Data

US 2018/0137631 A1    May 17, 2018

(30) Foreign Application Priority Data

Nov. 11, 2016    (KR) .................. 10-2016-0150303

(51) Int. Cl.
     *G06T 7/246*      (2017.01)
     *G06T 7/223*      (2017.01)
     *G01W 1/10*      (2006.01)

(52) U.S. Cl.
     CPC ............... *G06T 7/248* (2017.01); *G01W 1/10* (2013.01); *G06T 7/223* (2017.01);
     (Continued)

(58) Field of Classification Search
     CPC ..................... G06T 7/248; G06T 7/223; G06T 2207/30192; G06T 2207/20076;
     (Continued)

(56) References Cited

U.S. PATENT DOCUMENTS

| | | | | |
|---|---|---|---|---|
| 2004/0258152 | A1* | 12/2004 | Herz | ................ G08B 13/19669 375/240.16 |
| 2008/0100721 | A1* | 5/2008 | Ayaki | ..................... H04N 5/232 348/222.1 |

(Continued)

FOREIGN PATENT DOCUMENTS

KR      10-0275694      12/2000

OTHER PUBLICATIONS

Park et al. "Sensitivity of Satellite-Derived Wind Retrieval Over Cloudy Scenes to Target Selection in Tracking and Pixel Selection in Height Assignment." IEEE Transactions on Geoscience and Remote Sensing, vol. 50, No. 5, May 2012, pp. 2063-2073 (Year: 2012).*

(Continued)

*Primary Examiner* — Jon Chang
(74) *Attorney, Agent, or Firm* — Staas & Halsey LLP

(57) ABSTRACT

Disclosed are a method and an apparatus for determining displacement information of a target area by using information that is present in an image frame. The method of determining displacement information according to an embodiment of the present disclosure may include: setting a target area in which an object that displacement information determination thereof is required is positioned within a target frame; determining a tracking area in a tracking frame (Continued)

based on displacement information of at least one neighboring target area that is positioned around the target area; and determining a matching area that matches with the target area in the tracking area and determining the displacement information of the target area.

15 Claims, 12 Drawing Sheets

(52) U.S. Cl.
CPC ........... *G06T 2207/10004* (2013.01); *G06T 2207/10032* (2013.01); *G06T 2207/20021* (2013.01); *G06T 2207/20076* (2013.01); *G06T 2207/30192* (2013.01)

(58) Field of Classification Search
CPC . G06T 2207/10004; G06T 2207/10032; G06T 2207/20021; G01W 1/10
See application file for complete search history.

(56) References Cited

U.S. PATENT DOCUMENTS

| | | | |
|---|---|---|---|
| 2011/0150277 A1* | 6/2011 | Ishii | G06K 9/4652 382/103 |
| 2012/0093217 A1* | 4/2012 | Jeon | H04N 19/46 375/240.02 |
| 2014/0126645 A1 | 5/2014 | Lim et al. | |
| 2016/0232676 A1 | 8/2016 | Baek et al. | |

OTHER PUBLICATIONS

Byung-il Lee, "Geo-Kompsat-2A AMI Atmospheric Motion Vector Algorithm Theoretical Basis Document," Satellite Development Division, National Meteorological Satellite Center, Korea Meteorological Administration, Feb. 2016.

* cited by examiner

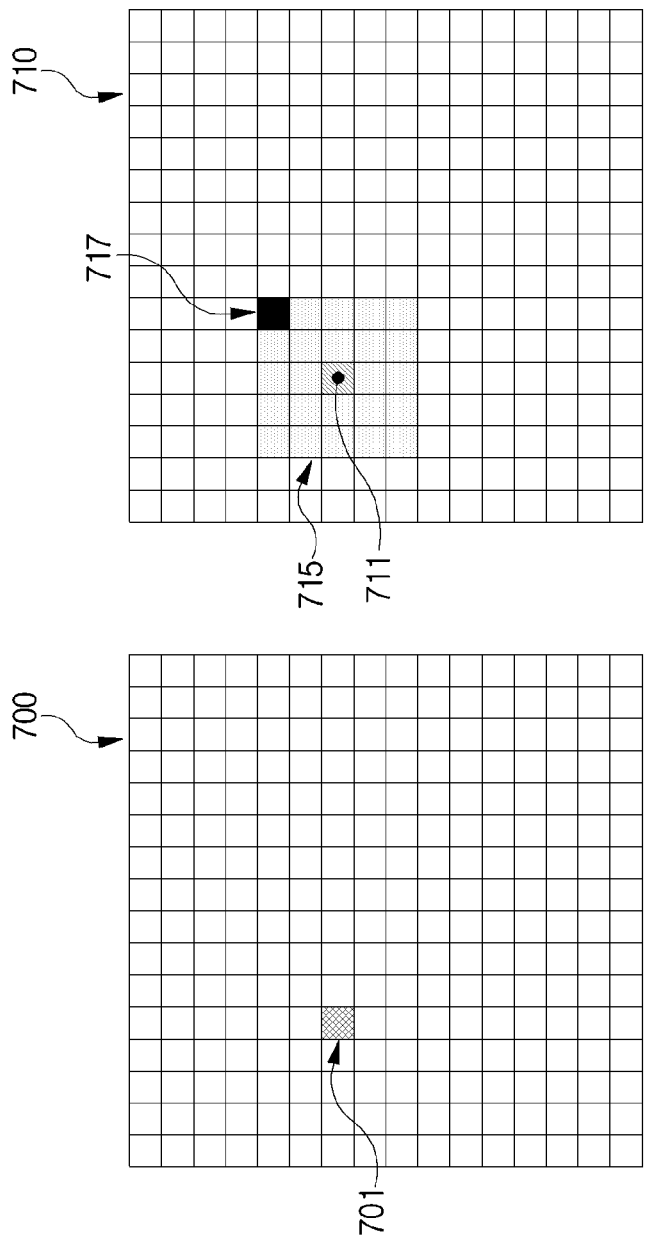

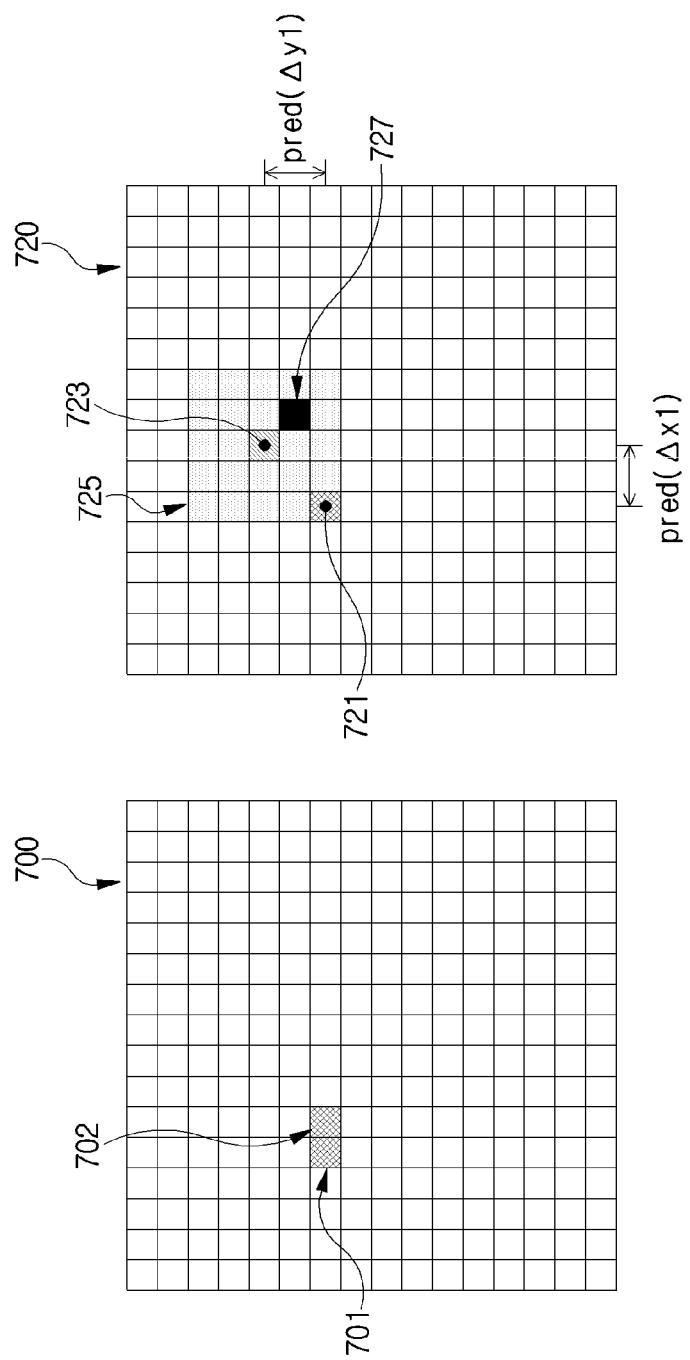

METHOD AND APPARATUS FOR DETERMINING DISPLACEMENT INFORMATION OF TARGET AREA AND METHOD AND APPARATUS FOR DETERMINING ATMOSPHERE INFORMATION USING THE SAME

CROSS REFERENCE TO RELATED APPLICATION

The present application claims priority to Korean Patent Application No. 10-2016-0150303, filed Nov. 11, 2016, the entire contents of which is incorporated herein for all purposes by this reference.

BACKGROUND OF THE INVENTION

Field of the Invention

The present disclosure generally relates to a method and an apparatus for determining displacement information. More particularly, the present disclosure relates to a method and an apparatus for predicting a tracking area that is necessary for determining displacement information.

Description of the Related Art

Various techniques have been developed to detect and track objects included in images.

Particularly, atmosphere motion information obtained by estimating clouds or vapour included in images is used as important data to predict the weather.

At present, in order to calculate atmosphere motion information, support data (for example, numerical forecast data, used for Numerical Weather Prediction, or NWP) is received from an external system and atmosphere motion information is investigated based on the received data. However, since the support data used for investigating atmosphere motion information is large and requires many calculations, a high-performance computing system is required as a resource, or communication cooperation with a high-performance computing system is required. In order to implement such a high-performance computing system or communication cooperation therewith, a considerable amount of technology and cost are required, so that it is difficult to implement an apparatus or a system for calculating atmosphere motion information.

The foregoing is intended merely to aid in the understanding of the background of the present invention, and is not intended to mean that the present invention falls within the purview of the related art that is already known to those skilled in the art.

SUMMARY OF THE INVENTION

A technical problem of the present disclosure is to provide a method and an apparatus for determining displacement information of a target area by using information existing in an image frame in an environment in which no additional data is provided.

A further technical problem of the present disclosure is to provide a method and an apparatus for efficiently determining displacement information of a target area in a limited environment.

Another technical problem of the present disclosure is to provide a method and an apparatus efficiently determining atmosphere motion information by using information existing in an image frame in an environment in which no support data is provided for investigating the atmosphere motion information.

Technical problems obtainable from the present disclosure are non-limited by the above-mentioned technical problems, and other unmentioned technical problems may be clearly understood from the following description by those having ordinary skill in the technical field to which the present disclosure pertains.

According to one aspect of the present disclosure, there may be provided a method of determining displacement information. The method may include: setting a target area in which an object whose displacement information is required to be determined is positioned within a target frame; determining a tracking area in a tracking frame based on displacement information of at least one neighboring target area that is positioned around the target area; and determining a matching area that matches with the target area in the tracking area and determining the displacement information of the target area. According to another aspect of the present disclosure, there may be provided an apparatus for determining displacement information. The apparatus may include: a target area determining unit setting a target area in which an object whose displacement information is required to be determined is positioned within a target frame; and a displacement information calculating unit determining a tracking area in a tracking frame based on displacement information of at least one neighboring target area positioned around the target area, and determining displacement information associated with the target area in the tracking area.

According to still another aspect of the present disclosure, there may be provided a method of determining atmosphere motion information. The method may include: setting a target area used for determining atmosphere motion information in a target frame; determining a tracking area in a tracking frame based on displacement information of a neighboring target area positioned around the target area; tracking a matching area that matches with the target area in the tracking area and determining displacement information of the target area; determining altitude information of the target area; and determining the atmosphere motion information by reflecting the displacement information and the altitude information of the target area.

According to still another aspect of the present disclosure, there may be provided an apparatus for determining atmosphere motion information. The apparatus may include: a target area determining unit determining a target area in which atmosphere motion information therein is determined; a displacement information calculating unit determining a tracking area in the target area based on displacement information of a neighboring target area distributed around the target area, and determining displacement information of the target area by tracking a matching area that matches with the target area; an altitude information determining unit determining altitude information of the target area; and an atmosphere motion information managing unit determining atmosphere motion information by using the displacement information and the altitude information of the target area.

For the purposes of this disclosure, the above briefly summarized features are merely illustrative aspects of the detailed description of the disclosure that follows and do not limit the scope of the present disclosure.

According to the present disclosure, there may be provided a method and an apparatus for determining displacement information of a target area by using information existing in an image frame.

In addition, according to the present disclosure, there may be provided a method and an apparatus for efficiently determining displacement information of a target area in a limited environment.

In addition, according to the present disclosure, there may be provided a method and an apparatus for determining atmosphere motion information by using information existing in an image frame in an environment in which no numerical forecast data is provided.

Effects obtainable from the present disclosure are non-limited by the above mentioned effect. In addition, other unmentioned effects may be clearly understood from the following description by those having ordinary skill in the technical field to which the present disclosure pertains.

BRIEF DESCRIPTION OF THE DRAWINGS

The above and other objects, features and other advantages of the present invention will be more clearly understood from the following detailed description when taken in conjunction with the accompanying drawings, in which:

FIGS. 7A to 7C are views for showing detailed operations of the displacement information calculating unit according to the present disclosure;

DETAILED DESCRIPTION OF THE INVENTION

Figure 1:
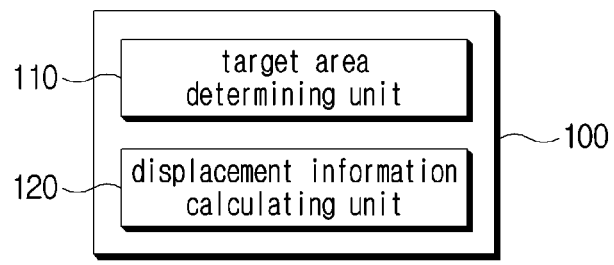
FIG. 1 is a block diagram of an apparatus for determining displacement information according to an embodiment of the present disclosure.

Hereinafter, with reference to drawings, embodiments of the present disclosure are described in detail in a manner that one of ordinary skill in the art may perform the embodiments without undue difficulty. However, as those skilled in the art would realize, the described embodiments may be modified in various different ways, all without departing from the spirit or scope of the present disclosure.

To avoid obscuring the subject matter of the present disclosure, while embodiments of the present disclosure are illustrated, well known functions or configurations will be omitted from the following descriptions. The drawings and description are to be regarded as illustrative in nature and not restrictive. Like reference numerals designate like elements throughout the specification.

In the present disclosure, when an element is mentioned to be "coupled" or "connected" to another element, this may mean that it is directly coupled or connected to the other element, but it is to be understood that yet another element may exist in-between. In addition, it will be understood that the terms "comprises", "comprising", "includes", "including" when used in this specification, specify the presence of one or more other components, but do not preclude the presence or addition of one or more other components unless defined to the contrary.

In the present disclosure, the terms first, second, etc. are used only for the purpose of distinguishing one element from another, and do not limit the order or importance, etc., between elements unless specifically mentioned. Therefore, within the scope of the present disclosure, a first component of an embodiment may be referred to as a second component in another embodiment, or similarly, a second component may be referred to as a first component.

In the present disclosure, the components that are distinguished from each other are intended to clearly illustrate each feature and do not necessarily mean that components are separate. In other words, a plurality of components may be integrated into one hardware or software unit or one component may be distributed into a plurality of hardware or software units. Thus, unless otherwise noted, such integrated or distributed embodiments are also included within the scope of the present disclosure.

In the present disclosure, the components described in the various embodiments are not necessarily essential components, and some may be optional components. Thus, embodiments including a subset of the components described in one embodiment are also included within the scope of this disclosure. Also, embodiments that include other elements in addition to those described in the various embodiments are also included within the scope of the present disclosure.

Definitions of terms that are used in the present disclosure are as follows.

In the present disclosure, a target area may be an area in which an object that displacement information determination thereof is required is present. The target area may be an area that is selected in a predetermined size unit in an image frame and the target area may include areas irregularly distributed in the image frame. In the present disclosure, being irregularly distributed may refer to one or more target areas that may be distributed in various ways according to object characteristics.

In the present disclosure, a neighboring target area refers to a target area that is present around the target area. Since the target area is irregularly distributed, the neighboring target area may include one of a target area that is adjacent to a base target area, a target area that is present within a predetermined size range around the base target area, and a predetermined number of target areas that are closest to the base target area. Hereinafter, embodiments of the present disclosure will be described with reference to the accompanying drawings.

FIG. 1 is a block diagram of an apparatus for determining displacement information according to an embodiment of the present disclosure.

Referring to FIG. 1, the apparatus for determining displacement information according to the embodiment of the present disclosure may include a target area determining unit 110 and a displacement information calculating unit 120.

The target area determining unit 110 may determine a target area and provide the determined target area to the displacement information calculating unit 120. Herein, the target area may be an area in which an object whose displacement information is required to be determined is present, and may include an area in which at least one object whose motion is tracked within a single image frame. For example, the target area may be an area that is necessary for determining atmosphere motion information and may include an area in which an object whose displacement information is required to be determined is positioned in at least one image frame obtained by imaging the earth. In other words, the target area may be an area in which an object such as clouds or vapour is present within the image frame of the earth image. Although the embodiment of the present disclosure shows that the target area is an area in which an object such as clouds or vapour is present in the image frame of the earth image, it is not limited thereto. It is sufficient for the present disclosure that the target area includes an object whose motion is identified or detected within the image frame.

In addition, in the present disclosure, the target area may include areas irregularly distributed in some selected areas, or regularly or irregularly, continuously or discontinuously distributed among areas obtained by dividing the image frame into a predetermined size unit.

Meanwhile, the at least one image frame may include a base image frame that is obtained at timing t, a previous image frame that is obtained at timing t-z that is before the timing t (herein, z is a natural number), and a following image frame that is obtained at timing t+z that is after the timing t (herein, z is a natural number).

Hereinafter, in the embodiment of the present disclosure, the image frame including the target area that becomes a base for determining displacement information is referred to a target frame, and the image frame that becomes a target to determine the displacement information of the target area is referred to a tracking frame. For example, when the target frame is the base image frame, the tracking frame may be the following image frame, or when the target frame is the previous image frame, the tracking frame may be the base image frame.

Figure 2:
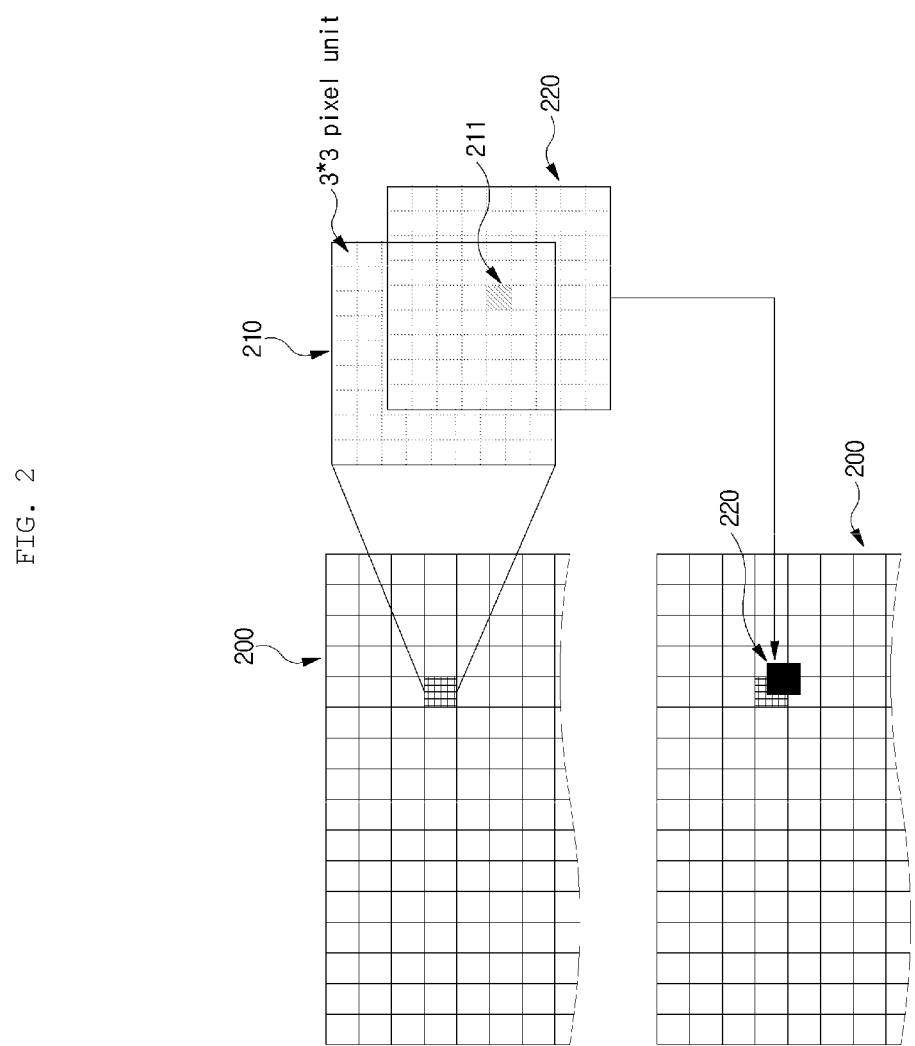
FIG. 2 is a view showing a target area determined in the apparatus for determining displacement information according to the embodiment of the present disclosure.

FIG. 2 is a view showing the target area determined in the apparatus for determining displacement information according to the embodiment of the present disclosure. Referring to FIG. 2, the target area determining unit 110 may determine a target area within a target frame 200 by considering the above characteristics of the target area. For example, the target area determining unit 110 may divide the target frame 200 into blocks of a first predetermined size unit (for example, i×j pixel unit (herein, i and j are natural numbers)), divide the blocks of the first predetermined size unit into blocks of a second predetermined size unit (for example, k×l pixel unit (herein, k and l are natural numbers)) and calculates standard deviations of the respective blocks of the second predetermined size unit, and may set the target area based on a block of the second predetermined size unit that has the largest standard deviation value. In addition, the target area determining unit 110 may selectively set an area in which the object whose displacement information is required to be determined is present (for example, the block of the first size unit) to the target area. Herein, the target area may be set in a size of n×m pixel unit (herein, n and m are natural numbers), and may be formed in a square or rectangle.

The target area determining unit 110 may provide information of the target area (hereinafter, 'target area information') determined by the above operations to the displacement information calculating unit 120. For example, the target area information may include information of a size (hereinafter, 'size information') and a position (hereinafter, 'positional information') of the target area.

Hereinafter, referring to FIG. 2, detailed operations for setting the target area of the target area determining unit 110 will be described.

The target area determining unit 110 may set the target frame 200 in a first unit block of a first predetermined size unit (for example, i*j pixel unit) and select an area 210 in which an object whose displacement information is required to be determined is present. In addition, the target area determining unit 110 may divide the selected area 210 into blocks of a second predetermined size unit (for example, k×l pixel unit), calculate standard deviations of the respective divided blocks of the second size unit, and set an area 220 based on a block 211 having the highest standard deviation to a target area. Herein, a size of the target area may be set the same as the first predetermined size. Although the size of the target area is described as above, it is not limited thereto in the present disclosure. It is sufficient for the present disclosure to set the size of the target area the same as the second predetermined size or greater.

As the target area determining unit 110 sets the target area by the above operations, the target area may include areas irregularly distributed within the target frame such as continuously distributed with another target area, distributed at a position including an area that is overlapped with another target area, distributed at a position spaced away from target area by a predetermined distance, etc.

Meanwhile, the displacement information calculating unit 120 may determine displacement information of at least one target area that is provided from the target area determining unit 110. Particularly, the displacement information calculating unit 120 may predict displacement information of another target area that is irregularly distributed within the target frame by using the displacement information of the target area. For example, the displacement information calculating unit 120 may receive target area information from the target area determining unit 110 and store the displacement information (for example, a motion vector) of the target area included within the target frame. As the displacement information calculating unit 120 sequentially determines and stores the displacement information of target areas included in the target frame, the displacement information calculating unit 120 may store displacement information of another target area that is previously calculated before calculating displacement information of the target area. Therefore, the displacement information calculating unit 120 may predict the displacement information of the target area by using the displacement information of another target area that is previously calculated. Particularly, the displacement information calculating unit 120 may predict the displacement information of the target area by using displacement information of a target area that is adjacent to the target area (in other words, neighboring target area), and may set a predetermined tracking area by using the displacement information that is predicted as above (hereinafter, 'prediction displacement information'). In addition, the displacement information calculating unit 120 may determine the displacement information (for example, a motion vector)

of the target area by detecting a matching block that matches with the target area within the tracking area.

Figure 3:
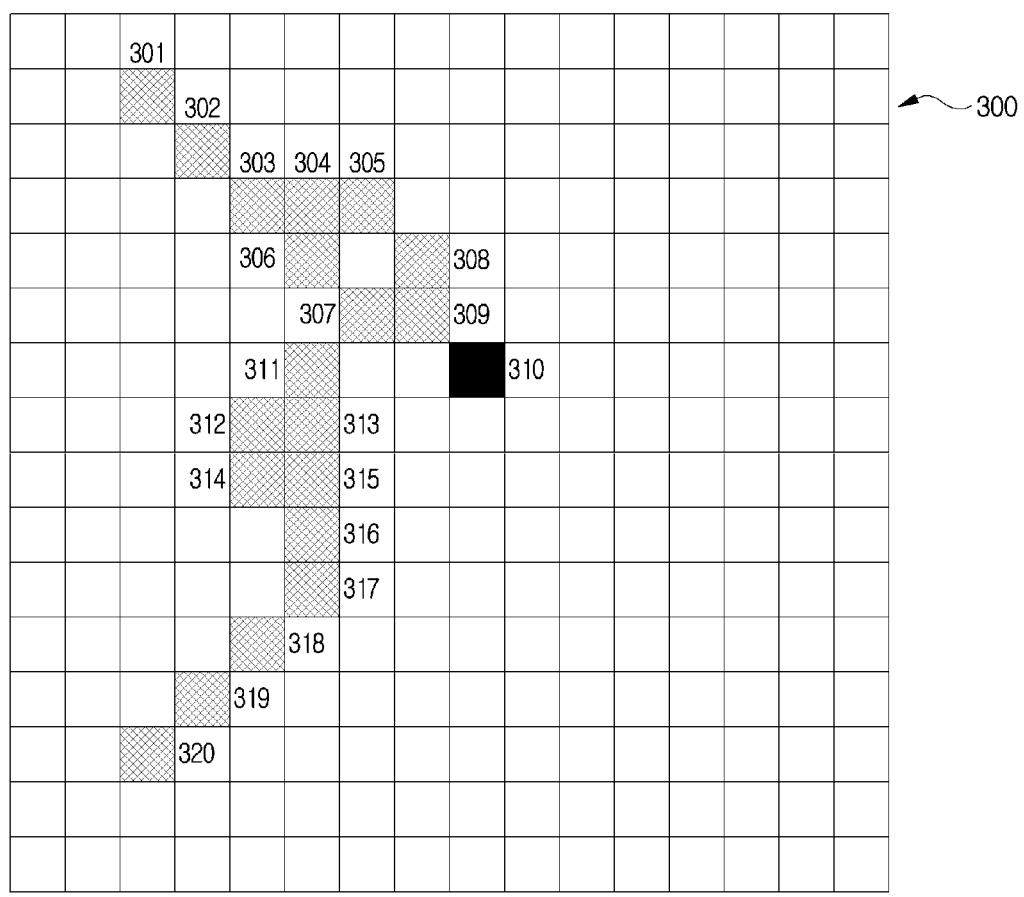
FIG. 3 is a first example view of a target frame for showing operations of a displacement information calculating unit according to the present disclosure.

The displacement information calculating unit 120 may determine the prediction displacement information by calculating a median value of displacement information of at least one neighboring target area. In addition, as another example, the displacement information calculating unit 120 may determine the prediction displacement information by applying a weighted value in which a distance between the target area and the neighboring target area is reflected. FIG. 3 is a first example of the target frame for showing operations of the displacement information calculating unit according to the present disclosure. Hereinafter, referring to FIG. 3, detailed operations of the displacement information calculating unit will be described.

First, referring to FIG. 3, a target frame 300 includes target areas 301~320 that are irregularly distributed. When the target areas 301~320 are distributed as shown in FIG. 3, the displacement information calculating unit 120 may receive information of the target areas 301~320 from the target area determining unit 110, and determine displacement information (for example, a motion vector) of the respective target areas 301~320. For example, assuming that the displacement information calculating unit 120 sequentially determines displacement information (for example, a motion vector) of a first target area 301 to a 20-th target area 320, and assuming that the displacement information calculating unit 120 shows operations of determining displacement information (for example, a motion vector) of a 10-th target area 310. The displacement information calculating unit 120 may determine a neighboring target area of the 10-th target area 310 among the determined target areas that are previously determined.

The embodiment of the present disclosure shows that the displacement information calculating unit 120 sets target areas that are present within a predetermined size range from the 10-th target area to neighboring target areas. Therefore, the displacement information calculating unit 120 may determine a 7-th target area 307, an 8-th target area 308, and a 9-th target area 309 to the neighboring target areas of the 10-th target area 310. The displacement information calculating unit 120 may determine a tracking area of the 10-th target area 310 by using the displacement information (for example, a motion vector) of the 7-th target area 307, the 8-th target area 308, and the 9-th target area 309. In other words, the displacement information calculating unit 120 may estimate prediction displacement information (for example, (Pred(Δx), Pred(Δy))) by calculating a median value of respective displacement information (for example, a motion vector) of the 7-th target area 307, the 8-th target area 308, and the 9-th target area 309, and may set the tracking area associated with the 10-th target area 310 by reflecting the prediction displacement information at a position of the 10-th target area 310.

The displacement information calculating unit 120 may calculate the prediction displacement information by using the formula 1 below.

$$pred(\Delta x) = \text{Median}\{A(\Delta x), B(\Delta x), C(\Delta x)\}$$

$$pred(\Delta y) = \text{Median}\{A(\Delta y), B(\Delta y), C(\Delta y)\} \quad \text{[Formula 1]}$$

Herein, Pred(x) is prediction displacement information of an X-axis, and Pred(y) is prediction displacement information of a Y-axis. A(x), B(x), and C(x) are respective displacement information of an X-axis of the 7-th target area 307, the 8-th target area 308, and the 9-th target area 309. A(y), B(y), and C(y) are respective displacement information of a Y-axis of the 7-th target area 307, the 8-th target area 308, and the 9-th target area 309.

The displacement information calculating unit 120 may set coordinates (for example, (Search_center_Point(x), Search_center_Point(y))) of a tracking base point by determining coordinates (for example, (Colocation(x), Colocation(y))) that are associated with coordinates (x, y) of the center point of the 10-th target area 310 in a tracking frame and by reflecting the prediction displacement information (for example, (Pred(x), Pred(y)) on the associated point. The displacement information calculating unit 120 may set a tracking area having a predetermined size (for example, p×q pixel unit (p and q are natural numbers)) and around the tracking base point. For example, the displacement information calculating unit 120 may set the coordinates of the tracking base point (for example, (Search_center_Point(x), Search_center_Point(y))) by using the formula 2 below.

$$\text{Search\_center\_Point}(x) = \text{colocation}(x) + Pred(x)$$

$$\text{Search\_center\_Point}(y) = \text{Colocation}(y) + Pred(y) \quad \text{[Formula 2]}$$

In addition, the displacement information calculating unit 120 may determine the displacement information (for example, a motion vector) of the 10-th target area 310 by detecting a matching block that matches with the 10-th target area 310 in the tracking area. For example, the displacement information calculating unit 120 may calculate cross-correlation coefficients between blocks (blocks that are divided into a size of the 10-th target area 310) included in the tracking area and the 10-th target area 310, and determines displacement information (for example, a motion vector) of a block that has the optimum cross-correlation coefficient as the displacement information (for example, a motion vector) of the 10-th target area 310. Herein the optimum cross-correlation coefficient may be the highest cross-correlation coefficient value. When the highest cross-correlation coefficient value is in plural, a block that is positioned closest to the 10-th target area 310 may be determined as the block having the optimum cross-correlation coefficient. Although the embodiment of the present disclosure shows operations of determining the block having the optimum cross-correlation coefficient, it is not limited thereto. It is sufficient for the embodiment of the present disclosure to detect the matching block that matches with the target area.

Figure 4:
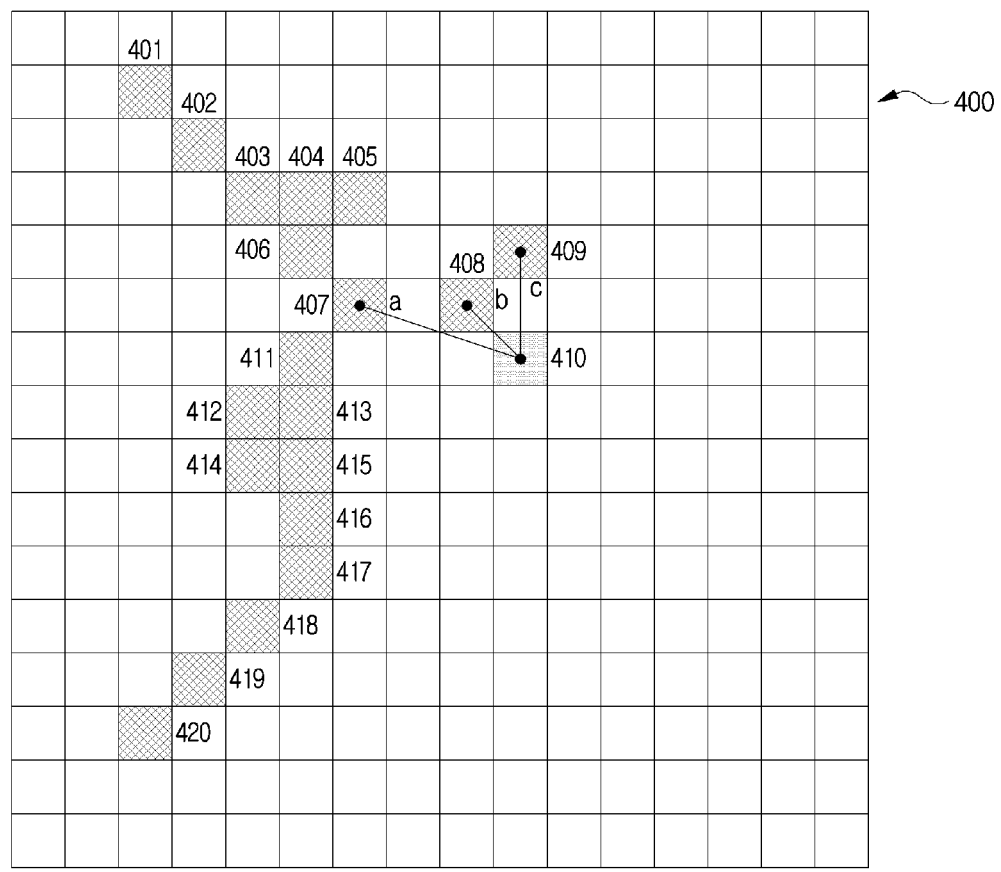
FIG. 4 is a second example view of the target frame for showing operations of the displacement information determining unit according to the present disclosure.

FIG. 4 is a second example of the target frame for showing operations of the displacement information determining unit according to the embodiment of the present disclosure. Hereinafter, referring to FIG. 4, detailed operations of the displacement information calculating unit will be described.

FIG. 4 shows an example in which a target frame 400 includes target areas 401420 that are irregularly distributed. In the embodiment of the present disclosure, assuming that the displacement information calculating unit 120 sequentially determines displacement information (for example, a motion vector) of a first target area 401 to a 20-th target area 420, operations of determining displacement information (for example, a motion vector) of a 10-th target area 410 will be described. The displacement information calculating unit 120 may determine a 7-th target area 407, an 8-th target area 408, and a 9-th target area 409 as neighboring target areas, and estimate the displacement information of the 10-th target area 410 by applying a weighted value to the neighboring target areas.

Meanwhile, the weighted value may be a value in which distances between the 10-th target area 410 and the neighboring target areas (for example, the 7-th target area 407, the 8-th target area 408, and the 9-th target area 409) are reflected inversely proportional. For example, when a distance between the 10-th target area 410 and the 7-th target area 407 is a as shown, a distance between the 10-th target area 410 and the 8-th target area 408 is b as shown, and a distance between the 10-th target area 410 and the 9-th target area 409 is c as shown, a weighted value α for the 7-th target area 407, a weighted value β for the 8-th target area 408, and a weighted value γ for the 9-th target area 40 may be determined by using the formula 3 below.

$$\alpha = \frac{bc}{ab+bc+ca}$$
$$\beta = \frac{ac}{ab+bc+ca}$$
$$\gamma = \frac{ab}{ab+bc+ca}$$
[Formula 3]

In addition, prediction displacement information (Pred(Δx1), Pred(Δy1)) of the 10-th target area 410 may be determined by using the below formula 4.

$$Pred(\Delta x1) = \Sigma \alpha A(\Delta x) + \beta B(\Delta x) + \gamma C(\Delta x)$$

$$Pred(\Delta y1) = \Sigma \alpha A(\Delta y) + \beta B(\Delta y) + \gamma C(\Delta y)$$
[Formula 4]

Herein, 0≤α, β, γ≤1, α++γ=1

Pred(Δx1) is prediction displacement information of an X-axis of the 10-th target area 410, A(Δx) is displacement information of an X-axis of the 7-th target area 407, B(Δx) is displacement information of an X-axis of the 8-th target area 408, C(Δx) is displacement information of X-axis of the 9-th target area 409, Pred(Δy1) is prediction displacement information of a Y-axis of the 10-th target area 410, A(Δy) is displacement information of a Y-axis of the 7-th target area 407, B(Δy) is displacement information of a Y-axis of the 8-th target area 408, and C(Δy) is displacement information of a Y-axis of the 9-th target area 409.

Therefore, the displacement information calculating unit 120 may set a tracking area associated with the 10-th target area 410 by reflecting the prediction displacement information (Pred(Δx1), Pred(Δy1)) at a position of the 10-th target area 410, and determine displacement information (for example, a motion vector) of the 10-th target area 410 by detecting a matching block that matches with the 10-th target area 410.

Although the weighted value is a value in which distances of respective target areas are reflected inversely proportional in the embodiment of the present disclosure, it is not limited thereto. The weighted value may be variously determined by reflecting relations with the neighboring target areas based on the target area.

Figure 5:
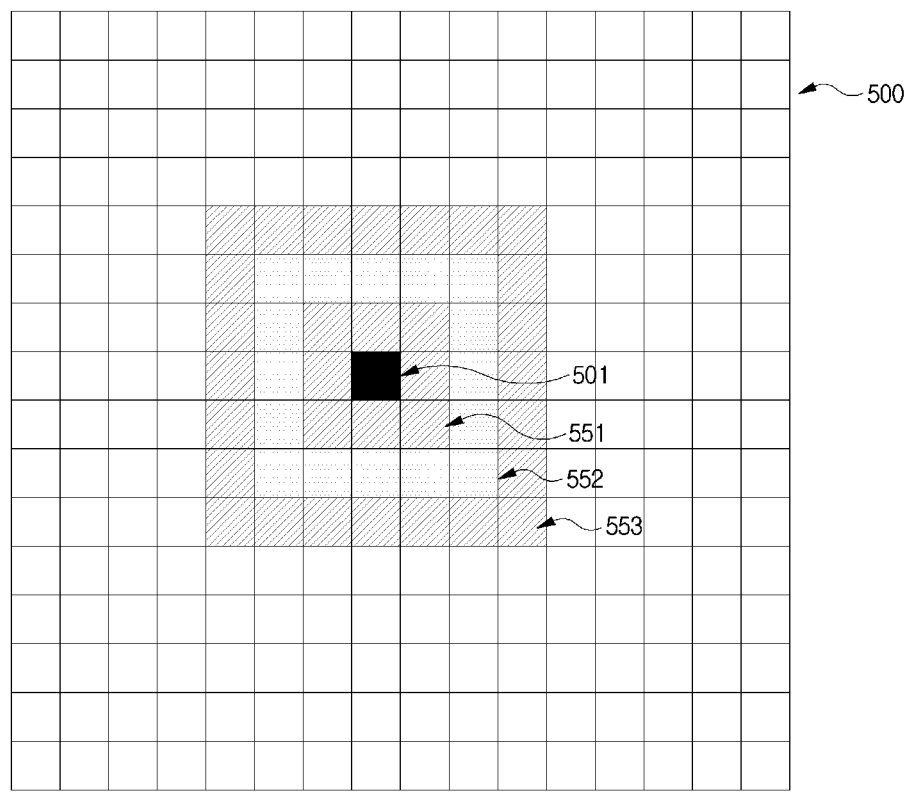
FIG. 5 is a view showing a weighted value that is exemplarily used in the displacement information determining unit according to the present disclosure.

FIG. 5 is a view showing the weighted value that is exemplarily used in the displacement information determining unit according to the present disclosure.

When a first target area 501 is positioned within a target frame 500, and when a neighboring target area is positioned in a first weighted value area 551 based on the first target area 501, a first weighted value is applied, or when the neighboring target area is positioned in a second weighted value area 552, a second weighted value is applied, or when the neighboring target area is positioned in a third weighted value area 553, a third weighted value is applied. Herein, the third weighted value may be set to be smaller than the second weighted value, and the second weighted value may be set to be smaller than the first weighted value. In addition, the embodiment of the present disclosure shows the first, second, third weighted value areas 551, 552, and 553, but it is not limited thereto. For example, more than the weighted value areas shown in the embodiment of the present disclosure may be set, or the weighted value for a neighboring target area that is positioned exceeding a predetermined distance may be set to 0.

Figure 6:
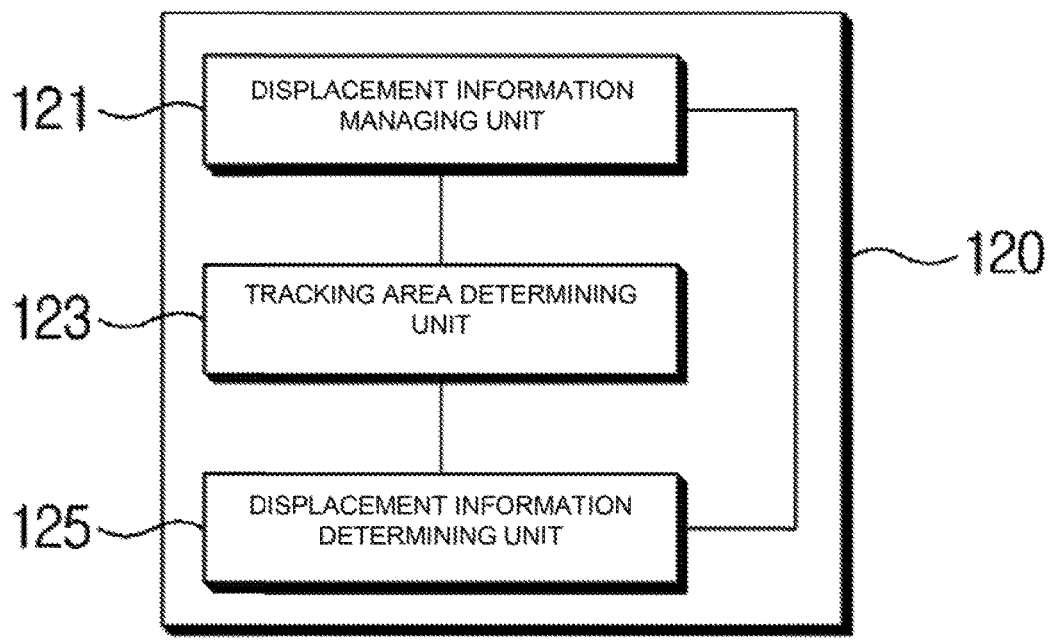
FIG. 6 is a view showing an example of a detailed configuration of the displacement information determining unit of FIG. 1.

FIG. 6 is a view showing an example of a detailed configuration of the displacement information determining unit of FIG. 1. Referring to FIG. 6, the displacement information calculating unit 120 may include a displacement information managing unit 121, a tracking area determining unit 123, and a displacement information determining unit 125.

The displacement information managing unit 121 may store target area information provided from the target area determining unit 110, and the target area information may include positional information and size information of at least one target area that is irregularly distributed within a target frame. The size information of the target area is information about a size of the target area set within the target frame, for example, may be information indicating a size of n×m pixel unit. The positional information of the target area may be information indicating a position at which the target area is positioned within the target frame. For example, the positional information of the target area may include coordinate values at which the target area is positioned, or a value that indicates how far from the target are is positioned from the upper left corner.

In addition, the displacement information managing unit 121 may store and mange the target area information, and displacement information (for example, a motion vector) of each target area.

The tracking area determining unit 123 may process operations of determining a tracking area of the target area. For example, the tracking area determining unit 123 determines at least one neighboring target area that is irregularly distributed around the target area, and obtains displacement information (for example, a motion vector) of the neighboring target area from the displacement information managing unit 121. In addition, the tracking area determining unit 123 may determine prediction displacement information based on the displacement information (for example, a motion vector) of the neighboring target area and determine the tracking area by reflecting the prediction displacement information on the target area. For example, the tracking area determining unit 123 may calculate the prediction displacement information by calculating a median value of the displacement information of the neighboring target area, or by applying a predetermined weighted value to the displacement information of the neighboring target area and by summing the displacement information to which the weighted value is applied. In addition, the tracking area determining unit 123 may set coordinates (for example, (Search_center_Point(x), Search_center_Point(y))) of a tracking base point by determining coordinates (for example, (Colocation(x), Colocation(y))) that are associated with the center point of the target area on a tracking frame and by reflecting the prediction displacement information (for example, (Pred(x), Pred(y)) on the associated point. In addition, the tracking area determining unit 123 may be set the tracking area that is around the tracking base point and has a predetermined size (for example, p×q pixel unit (p and q are natural numbers)).

The displacement information determining unit 125 may calculate displacement information (for example, a motion vector) of an area that is associated with the target area within the tracking area. For example, the displacement information determining unit 125 may divide the tracking area into blocks of a size unit that is associated with a size of the target area and calculate respective cross-correlation coefficients between the target area and the divided blocks included in the tracking area. In addition, the displacement information determining unit 125 determines a block that has the optimum cross-correlation coefficient with the target area as a matching block, and determines displacement information (for example, a motion vector) between the target area and the matching block as displacement information (for example, a motion vector) of the target area. The displacement information of the target area determined as above may be provided to the displacement information managing unit 121 to be used for determining a tracking area of another target area.

Figure 7C:
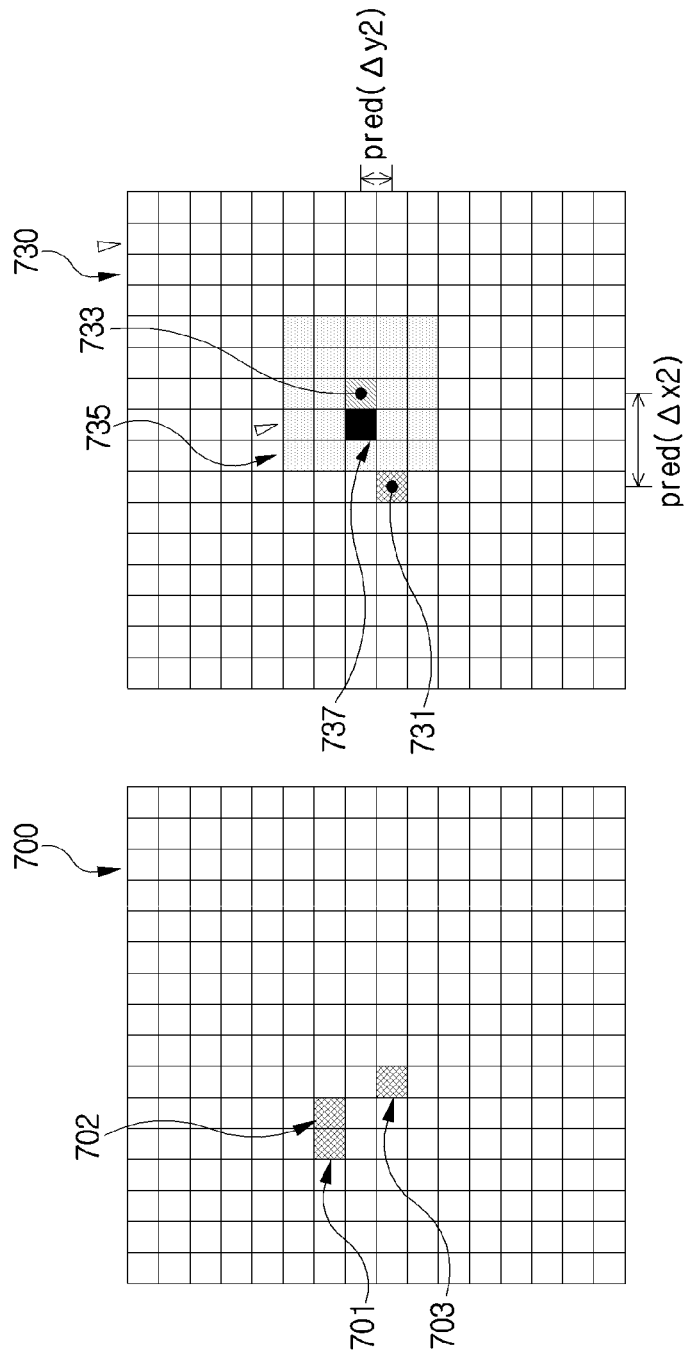

FIGS. 7A to 7C are views for showing detailed operations of the displacement information calculating unit according to the present disclosure.

Referring to FIGS. 7A to 7C, a target frame 700 may be an image including a target area described above, and tracking frames 710, 720 and 730 may be an image including a tracking area described above. When the target frame 700 is a base image frame obtained at timing t, the tracking frame 710, 720 and 730 may become the following image frame. Alternatively, when the target frame 700 is a previous image frame, the tracking frames 710, 720 and 730 may become the base image frame. In addition, FIGS. 7A to 7C show that the target frame 700 is a target area and includes a first target area 701, a second target area 702, and a third target area 703. FIG. 7A shows operations of determining displacement information of the first target area 701, FIG. 7B shows operations of determining displacement information of the second target area 702, and FIG. 7C shows operations of determining displacement information of the third target area 703.

Hereinafter, detailed operations of determining displacement information will be described with reference to FIG. 6 that shows the detailed configuration of the displacement information calculating unit 120 and with reference to FIGS. 7A to 7C.

First, the displacement information managing unit 121 may receive and store information of a target area (hereinafter, 'target area information') from the target area determining unit 110. For example, the displacement information managing unit 121 may store target area information of the first target area 701, the second target area 702, and the third target area 703 that are irregularly distributed in the target frame 700.

The tracking area determining unit 123 may determine displacement information (for example, a motion vector) of the respective target areas 701, 702 and 703 based on positional information of the first target area 701, the second target area 702, and the third target area 703 included in the target frame 700.

In the embodiment of the present disclosure, the tracking area determining unit 123 sequentially determines displacement information of the first target area 701, the second target area 702, and the third target area 703.

Referring to FIG. 7A, when displacement information (for example, a motion vector) of a neighboring target area that includes areas irregularly distributed around the first target area 701 is present, the tracking area determining unit 123 may also determine displacement information (for example, a motion vector) of the neighboring target area, and determine prediction displacement information by using the displacement information of the neighboring target area. However, since the displacement information (for example, a motion vector) of the neighboring target area that is irregularly distributed around the first target area 701 is not present, the tracking area determining unit 123 may not be able to determine the displacement information (for example, a motion vector) of the neighboring target area from the displacement information managing unit 121 and to process operations of determining the prediction displacement information. Therefore, the tracking area determining unit 123 may set prediction displacement information of the first target area 701 to "0", and set an associated point 711 at the center point of the first target area 701 in the tracking frame 710. Since the prediction displacement information is set to "0", the tracking area determining unit 123 sets a tracking area 715 of a predetermined size (for example, p*q pixel unit) that is around the associated point 711. In addition, the tracking area determining unit 123 provides the tracking area 715 determined as above to the displacement information determining unit 125. The displacement information determining unit 125 may divide the tracking area 715 into blocks of a size unit that is associated with a size of the target area 715 (for example, n×m pixel unit), calculate cross-correlation coefficients of between the target area 715 and the respective divided blocks included in the tracking area 715 based on the first target area 701, and determine a block that has the optimum cross-correlation coefficient as a matching block 717. In addition, the displacement information determining unit 125 may determine displacement information (for example, a motion vector) from the first target area 701 to the matching block 717 as the displacement information of the target area 701. The displacement information of the first target area 701 determined as above may be provided to the displacement information managing unit 121. The displacement information managing unit 121 may store the displacement information (for example, $A(\Delta x, \Delta y)$) of the first target area 701 and the target area information.

Next, referring to FIG. 7B, the tracking area determining unit 123 determines displacement information (for example, a motion vector) of a neighboring target area that is irregularly distributed around the second target area 702. For example, when the neighboring target area is present around the second target area 702, the tracking area determining unit 123 may obtain displacement information of the neighboring target area from the displacement information managing unit 121. Therefore, the tracking area determining unit 123 may determine that the first target area 701 is present as the neighboring target area, and request and receive the displacement information of the first target area 701 from the displacement information managing unit 121. In addition, when displacement information (for example, a motion vector) of a neighboring target area that is irregularly distributed around the second target area 702 is present, the tracking area determining unit 123 may determine prediction displacement information by using the displacement information of the neighboring target area.

The tracking area determining unit 123 may calculate the prediction displacement information (Pred($\Delta x1$), Pred($\Delta y1$)) of the second target area 702 by calculating a median value of the displacement information of the neighboring target area. Since the first target area 701 is present as the neighboring target area, the tracking area determining unit 123 may calculate the prediction displacement information of the second target area 702 by using only the displacement information ($A(\Delta x, \Delta y)$) of the first target area 701.

In another example, considering a position of the neighboring target area, the tracking area determining unit 123 may reflect a weighted value on the displacement information of the neighboring target area and determine the prediction displacement information by summing the displacement information on which the weighted value is reflected. Since only the first target area 701 is present as the neighboring target area around the second target area 702, the prediction displacement information of the second target area 702 may be calculated by setting the weighted value for the first target area 701 to 1.

The tracking area determining unit 123 may determine the displacement information (A(Δx,Δy)) of the first target area 701 as prediction displacement information (Pred(Δx1), Pred(Δy1)) of the second target area 702 by using the above operations of calculating the prediction displacement information.

The tracking area determining unit 123 may set an associated point 721 at a position of the center point of the second target area 702 in a tracking frame 720, and set coordinates of a tracking base point 723 by reflecting the displacement information (Pred(Δx1), Pred(Δy1)) of the first target area 701 on the associated point 721. The tracking area determining unit 123 may set a tracking area 725 of a predetermined size (for example, p×q pixel unit size) and around the tracking base point 723. In addition, the tracking area determining unit 123 provides the tracking area 725 determined as above to the displacement information determining unit 125. Accordingly, the displacement information determining unit 125 may divide the tracking area 725 into blocks of a size unit associated with a size of the second target area 702, calculate cross-correlation coefficients between the second target area 702 and the respective divided blocks included in the tracking area 725, and determine a block that has the optimum cross-correlation coefficient as a matching block 727. In addition, the displacement information determining unit 125 may determine displacement information (for example, B(Δx,Δy)) from the second target area 702 to the matching block 727 as displacement information (for example, a motion vector) of the second target area 702. The displacement information of the second target area 702 determined as above may be provided to the displacement information managing unit 121. The displacement information managing unit 121 may store the displacement information of the second target area 702 and the target area information.

Next, referring to FIG. 7C, the tracking area determining unit 123 determines displacement information (for example, a motion vector) of a neighboring target area that includes areas irregularly distributed around the third target area 703. For example, when a neighboring target area is present around the third target area 703, the tracking area determining unit 123 may obtain displacement information of the neighboring target area from the displacement information managing unit 121. Therefore, the tracking area determining unit 123 may determine that the first target area 701 and the second target area 702 are present as the neighboring target areas, and request and receive the displacement information of the first target area 701 and the second target area 702 from the displacement information managing unit 121. In addition, the tracking area determining unit 123 may determine prediction displacement information by using the displacement information of the neighboring target areas. For example, the tracking area determining unit 123 may determine the prediction displacement information by calculating a median value (median function) of the displacement information (A(Δx,Δy)) of the first target area 701 and the displacement information (B(Δx,Δy)) of the second target area 702. In another example, the tracking area determining unit 123 may determine the prediction displacement information by processing a calculation on which a weighted value considering a position of the neighboring target area is reflected. For example, the prediction displacement information (Pred(Δx2), Pred(Δy2)) may be determined by processing a calculation using the displacement information (A(Δx,Δy)) of the first target area 701, the displacement information (B(Δx,Δy)) of the second target area 702, an assumed weighted value α between the first target area 701 and the third target area 703, an assumed weighted value β between the second target area 702 and the third target area 703, and the formula 5 below.

$$pred(\Delta x2) = \Sigma \alpha A(\Delta x) + \beta B(\Delta x)$$

$$pred(\Delta y2) = \Sigma \alpha A(\Delta y) + \beta B(\Delta y) \quad \text{[Formula 5]}$$

The weighted values α and β may reflect distances between the third target area 703 and the neighboring target areas 701 and 702. For example, the weighted values α and β may be values in which the distances between the third target area 703 and the neighboring target areas 701 and 702 are set inversely proportional, and may be calculated by the above formula 3 and the disclosure describing the same. In addition, alternatively, as shown in FIG. 5 and the description thereof, the weighted values may be set stepwise considering the distances from the target area, the closer the distance between the target area and the neighboring target area, the larger weighted value may be applied.

Meanwhile, the tracking area determining unit 123 may set an associated point 731 at a position around the center point of the third target area 703 in a tracking frame 730, and set a tracking base point 733 by reflecting the prediction displacement information (Pred(Δx2), Pred(Δy2)) of the third target area 703 on the associated point 731. In addition, the tracking area determining unit 123 may set a tracking area 735 of a predetermined size (for example, p×q pixel unit size) that is around the tracking base point 723. In addition, the tracking area determining unit 123 provides the tracking area 735 determined as above to the displacement information determining unit 125. Accordingly, the displacement information determining unit 125 may divide the tracking area 735 into blocks of a size unit that is associated to a size of the third target area 703, calculate cross-correlation coefficients between the third target area 703 and the respective divided blocks included in the tracking area 735, and determine a block that has the optimum cross-correlation coefficient as a matching block 737. In addition, the displacement information determining unit 125 may determine the displacement information (for example, a motion vector) from the third target area 703 to the matching block 737 as displacement information of the third target area 703. The displacement information of the third target area 703 determined as above may be provided to the displacement information managing unit 121. The displacement information managing unit 121 may store the displacement information of the third target area 703 and the target area information.

Figure 8:
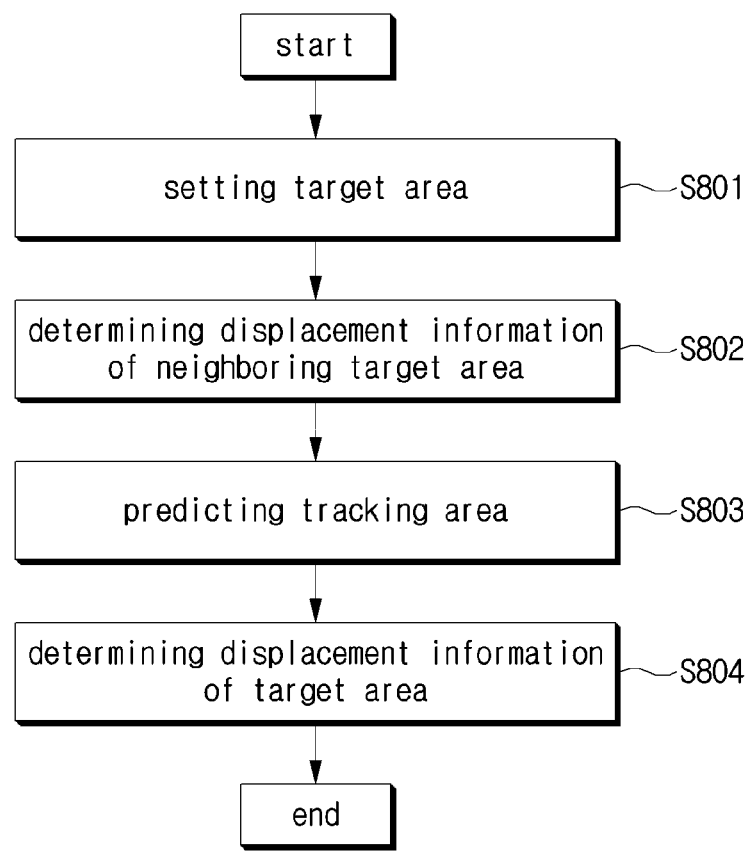
FIG. 8 is a flowchart showing a method of determining displacement information according to an embodiment of the present disclosure.

FIG. 8 is a flowchart showing a method of determining displacement information according to an embodiment of the present disclosure. The method of determining the displacement information may be performed by the above apparatus for determining displacement information.

In step S801, the apparatus for determining displacement information may determine a target area. The target area is an area in which an object whose displacement information is required to be determined is present, and may include within at least one target frame an area in which an object whose motion is tracked is present. In addition, in the present disclosure, the target area may be irregularly distributed in some selected areas among areas that are obtained by dividing the target frame into a predetermined size unit. In the present disclosure, being irregularly distributed may mean that the target area may be distributed in various ways according to object characteristics.

Considering this, the apparatus for determining displacement information may determine the target area within the target frame. The target frame may be divided into blocks of a first predetermined size unit (for example, i×j pixel unit), the blocks of the first predetermined size unit may be divided into blocks of a second size unit (for example, k×l pixel unit) included in the first size unit and standard deviations of the respective blocks of the second size unit may be calculated, and the target area may be set around a block of the second size having the largest standard deviation value. In addition, the apparatus for determining displacement information may selectively set the area in which the object that displacement information determination thereof is required is present (for example, first size unit block) as the target area. Herein, the target area may be set in an n×m pixel unit, and may be formed in a form of a square or rectangle.

A size of the target area may be set the same as the first size. In the present disclosure, the size of the target area is the same as the first size, but it is not limited thereto. It is sufficient for the present disclosure to set the size of the target area the same as the second predetermined size or greater.

The method of determining the displacement information according to the embodiment of the present disclosure may determine displacement information of target areas included in the target frame by repeating steps S802 to S804. In addition, when the target frame are in plural, the method of determining the displacement information may determine displacement information of the target areas included in the plurality of target frames by repeating steps S802 to S804.

The apparatus for determining the displacement information according to the embodiment of the present disclosure may sequentially determine and store displacement information of the target areas included in the target frames, thus the apparatus for determining the displacement information may store displacement information of another target area that is previously calculated before calculating the target area. Therefore, in step S802, the apparatus for determining the displacement information may determine displacement information of a target area that is positioned around the target area in which displacement information thereof is determined (in other words, neighboring target area).

For this, in step S802, the apparatus for determining displacement information may process operations of determining the neighboring target area. The neighboring target area may be set based on any one of a target area that is adjacent to the target area, a target area that is present in a predetermined size range around the target area, and a predetermined number of target areas that are present closest to the target area.

Next, in step S803, the apparatus for determining displacement information may calculate prediction displacement information that is predicted displacement information of the target area by using displacement information of the neighboring target area, and may set a predetermined tracking area (for example, p×q pixel unit) within the tracking frame by using the prediction displacement information. In detail, the apparatus for determining displacement information may determine coordinates (for example, (Colocation(x), Colocation(y))) of an associated point that is associated with coordinates (x, y) of the center point of the target area and associated on the tracking frame, and may set coordinates (for example, (Search_center_Point(x), Search_center_Point(y))) of a tracking base point by reflecting the prediction displacement information (for example, (Pred (Δx), Pred(Δy)) on the coordinates of the associated point. In addition, the apparatus for determining displacement information may set the tracking area of a predetermined size (for example, p×q pixel unit size) and around the tracking base point. For example, the apparatus for determining displacement information may set coordinates (for example, (Search_center_Point(x), Search_center_Point(y))) of the tracking base point by using the above formula 2.

The apparatus for determining displacement information may determine prediction displacement information by using the displacement information of the neighboring target areas. For example, when a first neighboring target area and a second neighboring target area are present as the neighboring target areas, the apparatus for determining displacement information may determine the prediction displacement information by calculating a median value (median function) of displacement information (for example, A(Δx, Δy)) of the first neighboring target area and displacement information (for example, B(Δx,Δy)) of the second neighboring target area.

Alternatively, the apparatus for determining displacement information may determine the prediction displacement information by processing a calculation on which a weighted value considering positions of the neighboring target area are reflected. For example, the prediction displacement information (for example, Pred(Δx), Pred(Δy)) may be determined by reflecting a weighted value α on the displacement information (for example, A(Δx,Δy)) of the first neighboring target area and by reflecting a weighted value β on the displacement information (for example, B(Δx,Δy)) of the second neighboring target area.

Meanwhile, the weighted values α and β may be set by reflecting distances between the target area in which displacement information thereof is determined and the neighboring target areas. For example, the weighted values α and β may be values in which the distances between the target area and the neighboring target areas are set inversely proportional, and may be calculated by using the above formula and the disclosure describing the same. In addition, alternatively, as shown in FIG. 5 and the description thereof, the weighted values may be set stepwise considering the distances from the target area, and the closer the distance between the target area and the neighboring target area, the larger the weighted value that may be applied.

Meanwhile, neighboring target areas may not be present according to a characteristic of the target area while calculating prediction displacement information. Therefore, when the neighboring target areas are not present, the apparatus for determining displacement information may process prediction displacement information to be "0". In addition, when a single neighboring target area is present according to the characteristic of the target area, the apparatus for determining displacement information may calculate the prediction displacement information (for example, Pred(Δx), Pred(Δy)) by using displacement information (for example, (Δx, Δy)) of the single neighboring target area.

In step S804, the apparatus for determining displacement information may calculate displacement information (for example, a motion vector) of an area associated with the target area within the tracking area. For example, the apparatus for determining displacement information may divide the tracking area into blocks of a size unit (for example, n×m pixel unit size) associated with a size of the target area, and calculate cross-correlation coefficients between the target area and the respective blocks within the tracking area. In addition, the apparatus for determining displacement information may determine a block that has the optimum cross-correlation coefficient with the target area as a matching block, and may determine displacement information (for example, a motion vector) between the target area and the matching block as displacement information (for example, a motion vector) of the target area. In addition, the apparatus for determining displacement information may store the displacement information of the target area determined as above to be used for determining a tracking area of another target area. Herein, the optimum cross-correlation coefficient may be the largest cross-correlation coefficient value. When the largest cross-correlation coefficient value is in plural, a block positioned closest to the target area may be determined as the block having the optimum cross-correlation coefficient. Although the embodiment of the present disclosure shows operation of determining the optimum cross-correlation coefficient, it is not limited thereto. It is sufficient for the embodiment of the present disclosure to detect the matching block that matches with the target area.

Figure 9:
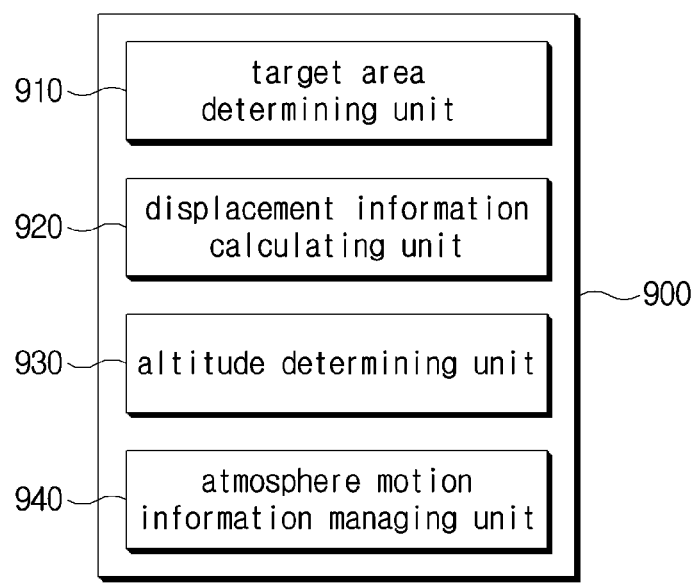
FIG. 9 is a block diagram showing an apparatus for determining atmosphere motion information according to an embodiment of the present disclosure.

FIG. 9 is a block diagram showing an apparatus for determining atmosphere motion information according to an embodiment of the present disclosure. Referring to FIG. 9, the apparatus for determining atmosphere motion information according to the embodiment of the present disclosure may include: a target area determining unit 910; a displacement information calculating unit 920; an altitude information determining unit 930; and an atmosphere motion information managing unit 940.

The target area determining unit 910 may determine a target area in which atmosphere motion information therein is determined, and provide the determined target area to the displacement information calculating unit 920. Herein, the target area is an area necessary for determining the atmosphere motion information, and may include an area in which an object through which an atmosphere motion is determined is present within at least one image frame obtained by imaging the earth. For example, the target area may be an area in which an object such as clouds or vapour is present within the image frame obtained by imaging the earth. Although the embodiment of the present disclosure shows that the target area is an area in which an object such as clouds or vapour is present within the image frame obtained by imaging the earth, it is not limited thereto. It is sufficient for the embodiment of the present disclosure that the target area is an area in which an atmosphere motion therein is identified or detected within an image frame.

Meanwhile, the at least one image frame may include a base image frame obtained at timing t, a previous image frame obtained at timing t-z (herein, z is a natural number) that is before the timing t, and a following image frame obtained at timing t+z (herein, z is a natural number) that is after the timing t.

Hereinafter, in the embodiment of the present disclosure, an image frame including the target area that becomes a base of determining displacement information is referred to a target frame, and an image frame that becomes a target to determine displacement information of the target area is referred to a tracking frame. For example, when the target frame is the base image frame, the tracking frame is the following image frame. Alternatively, when target frame is the previous image frame, the tracking frame is the base image frame.

The target area determining unit 910 may determine a target area within the target frame considering the above characteristic of the target area. For example, the target area determining unit 910 may divide the target frame into blocks of a first predetermined size unit (for example, i×j pixel unit, herein, i and j are natural numbers)), divide the blocks of the first predetermined size unit into blocks of a second predetermined size unit (for example, k×l pixel unit, herein, k and l are natural numbers)) included in the first size unit and calculate standard deviations of the respective blocks of the second predetermined size unit, and set a block of the second size unit having the largest standard deviation value and around thereon as the target area. In addition, the target area determining unit 910 may selectively set only an area in which an object that displacement information determination thereof is required is present (for example, first size unit block) to the target area. Herein, a size of the target area may be set the same as the predetermined first size. The embodiment of the present disclosure describes the size of the target area as above, but it is not limited thereto. It is sufficient for the embodiment of the present disclosure to set the size of the target area to be the same as the second predetermined size or greater.

In addition, the target area determining unit 910 may provide information of the target area that is determined as above to the displacement information calculating unit 920.

The displacement information calculating unit 920 may determine displacement information of at least one target area that is provided from the target area determining unit 910. Particularly, the displacement information calculating unit 920 may predict displacement information of another target area by using displacement information of at least one target area that is irregularly distributed within the target frame and predict displacement information (for example, a motion vector) of the target area based on the predicted displacement information.

In detail, the displacement information calculating unit 920 may store information of a target area (hereinafter, 'target area information') provided from the target area determining unit 910. The target area information may include positional information and size information of at least one target area that is irregularly distributed within the target frame. The size information of the target area may be information of a size in which the target area is set within the target frame, for example, n×m pixel unit (herein, n and m are natural numbers). The positional information of the target area may be information that indicates a position in which the target area is present within the target frame. For example, the positional information of the target area may include coordinate values at which the target area is positioned, or values indicating how far the target area is positioned from the left upper end. In addition, the displacement information calculating unit 920 may store and manage the target area information and the displacement information (for example, a motion vector) of each target area.

The displacement information calculating unit 920 may process operations of determining a tracking area of the target area. For example, the displacement information calculating unit 920 may determine at least one neighboring target area that is irregularly distributed around the target area, and determine displacement information (for example, a motion vector) of the neighboring target area. In addition, the displacement information calculating unit 920 predicts displacement information of the target area based on the displacement information (for example, a motion vector) of the neighboring target area, and determines a tracking area associated with the target area by using the displacement information predicted as above (hereinafter, 'prediction displacement information'). The displacement information calculating unit 920 may calculate displacement information (for example, a motion vector) of the target area within the tracking area. For example, the displacement information calculating unit 920 may divide the tracking area into blocks of a size associated with a size of the target area, and calculate cross-correlation coefficients between the target area and the respective divided block of the tracking area. In addition, the displacement information calculating unit 920 determines a block that has the optimum cross-correlation coefficient with the target area as a matching block, and determines displacement information (for example, a motion vector) between the matching block and the target area as displacement information (for example, a motion vector) of the target area. The displacement information of the target area determined as above may be stored and managed to be used for determining a tracking area of another target area.

Hereinafter, operations of the displacement information calculating unit 920 for determining a tracking area associated with the target area will be described in detail based on the displacement information of the neighboring target area.

The displacement information calculating unit 920 may calculate prediction displacement information by calculating a median value of the displacement information (for example, a motion vector) of the neighboring target area. For example, when a first neighboring target area and a second neighboring target area are present as neighboring target areas, the displacement information calculating unit 920 may determine the prediction displacement information (for example, Pred'($\Delta$x), Pred'($\Delta$y)) by calculating a median value (median function) of displacement information (for example, A'($\Delta$x,$\Delta$y)) of the first neighboring target area and displacement information (for example, B'($\Delta$x,$\Delta$y)) of the second neighboring target area.

Alternatively, the displacement information calculating unit 920 may apply a weighted value to the displacement information (for example, a motion vector) of the neighboring target area, and calculate the prediction displacement information by summing displacement information to which the weighted value is applied. The weighted value may be a value in which a distance between the target area and the neighboring target area is reflected inversely proportional. For example, the weighted value may be set by using the above formula 3 and the method describing the same. The prediction displacement information (Pred'($\Delta$x), Pred'($\Delta$y)) of the target area may be set by using the above formula 4 and the method describing the same.

Although the embodiment of the present disclosure reflects the weighted value on the distance between the neighboring target area and the target area as inversely proportional, it is not limited thereto. The weighted value may be variously set by reflecting relations between the neighboring target areas based on the target area.

When the displacement information is determines by using the above operations, the displacement information calculating unit 920 may determine an associated point (for example, (Colocation(x), Colocation(y))) that is associated with the center point of the target area in the target frame, and set coordinates (for example, (Search_center_Point(x), Search_center_Point(y))) of a tracking base point by reflecting the prediction displacement information (for example, (Pred'($\Delta$x), Pred'($\Delta$y)) on the associated point. In addition, the tracking area determining unit 123 may set a tracking area of a predetermined size (for example, p×q pixel unit size (p and q are natural numbers)) and is around the tracking base point.

The displacement information calculating unit 920 may calculate displacement information (for example, a motion vector) of the target area within the tracking area. For example, the displacement information calculating unit 920 may divide the tracking area into blocks of a predetermined size (for example, n×m pixel unit) that is associated with a size of the target area, and calculate cross-correlation coefficients between the target area and the respective divided blocks included in the tracking area. In addition, the displacement information calculating unit 920 determines a block having the optimum cross-correlation coefficient with the target area as a matching block, and determines displacement information (for example, a motion vector) between the target area and the matching block as displacement information (for example, a motion vector) of the target area. Herein, the optimum cross-correlation coefficient may be the highest cross-correlation coefficient value. When the highest cross-correlation coefficient value is in plural, a block that is positioned closest to the target area may be determined as the block having the optimum cross-correlation coefficient. Although the embodiment of the present disclosure describes operations of determining a block having the optimum cross-correlation coefficient, it is not limited thereto. It is sufficient for the embodiment of the present disclosure to detect a matching block that matches with the target area.

In addition, the displacement information of the target area determined by using the above operations may be provided to the target area determining unit 910 to be used for determining a tracking area of another target area.

Meanwhile, the altitude information determining unit 930 determines altitude information of the target area. Positioned altitude or characteristics of an object through which an atmosphere motion is determined may vary. The altitude information determining unit 930 may determine the altitude information of the target area by using color temperature of the object through which the atmosphere motion is determined. In addition, the altitude information determining unit 130 may determine an altitude of clouds or vapour by using luminance temperature of the object through which the atmosphere motion is determined. Accordingly, the altitude information determining unit 930 may determine the altitude information of the target area by determining luminance temperature of an area in which the object through which the atmosphere motion is determined is present.

Alternatively, the altitude information determining unit 930 may externally set the altitude information of the target area by receiving altitude information of a satellite from outside.

The atmosphere motion information managing unit 940 may store and manage atmosphere motion information of the target area by using the displacement information determined by displacement information calculating unit 920 and the altitude information determined by the altitude information determining unit 930. For example, the atmosphere motion information managing unit 940 may generate the atmosphere motion information including the displacement information and the altitude information of the target area. In addition, the displacement information may include first displacement information between a previous image frame and a base image frame, and second displacement information between the base image frame and a following image frame. The altitude information may include first altitude information of the previous image frame and second altitude information of the base image frame. Considering this, the atmosphere motion information may include first atmosphere motion information including the first displacement information and the first altitude information and second atmosphere motion information including the second displacement information and the second altitude information.

Preferably, the atmosphere motion information managing unit 940 may determine effectiveness of atmosphere motion information. For example, the atmosphere motion information managing unit 940 may determine the effectiveness of the atmosphere motion information by calculating a consistency between the first displacement information and the second displacement information. In other words, the atmosphere motion information managing unit 940 may determine the effectiveness of the atmosphere motion information by using at least one of a wind direction consistency, a wind speed consistency, and a vector consistency. In detail, the displacement information may include a size and direction of a vector. The atmosphere motion information managing unit 940 may determine a wind speed consistency by comparing sizes of vectors (for example, a first vector included in the first displacement information and a second vector included in the second displacement information), and determine a wind direction consistency by comparing directions of two vectors (for example, a first vector included in the first displacement information and a second vector included in the second displacement information). In addition, the atmosphere motion information managing unit 940 may calculate a vector consistency by comparing two vectors (for example, the first vector and the second vector). In addition, the atmosphere motion information managing unit 940 may determine a spatial homogeneity by using a final vector that is obtained by calculating an average of the first vector included in the first displacement information and the second vector included in the second displacement information, and the spatial homogeneity may be used for determining the effectiveness of the atmosphere motion information.

Preferable, the atmosphere motion information managing unit 940 may apply different weighted values to a wind direction consistency, a wind speed consistency, a vector consistency, and a spatial homogeneity for determining the effectiveness of the atmosphere motion information. For example, the atmosphere motion information managing unit 940 may apply a first weighted value 5 to a wind direction consistency, a wind speed consistency, and a vector consistency, and apply a second weighted value c to a spatial homogeneity. Herein, the second weighted value c may be set to be greater than the first weighted value 5.

Figure 10:
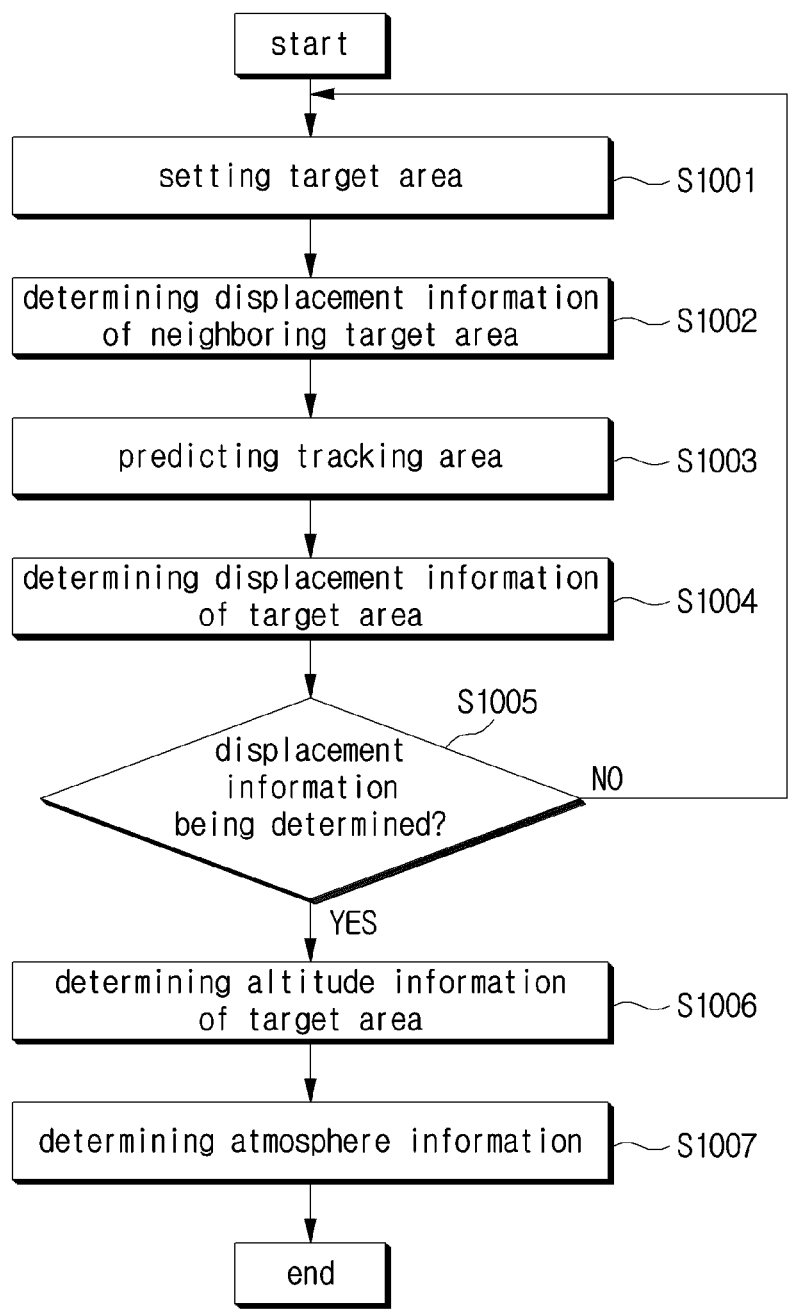
FIG. 10 is a flowchart showing a method of determining atmosphere motion information according to an embodiment of the present disclosure.

FIG. 10 is a flowchart showing a method of determining atmosphere motion information according to an embodiment of the present disclosure.

FIG. 10 is the flowchart showing the method of determining atmosphere motion information according to the embodiment of the present disclosure. The method of determining atmosphere motion information may be performed by the apparatus for determining atmosphere motion information.

In step S1001, the apparatus for determining atmosphere motion information may determine a target area. Herein, the target area may refer to an area necessary for determining atmosphere motion information and include an area in which an object through which displacement information is determined is positioned within at least one image frame obtained by imaging the earth. For example, the target area may be an area in which an object such as clouds or vapour is present within an image frame obtained by imaging the earth. Although the embodiment of the present disclosure describes that the target area is an area in which an object such as clouds or vapour is present within an image frame obtained by imaging the earth, it is not limited thereto. In the present disclosure, it is sufficient for the target area to be an area in which an object through which an atmosphere motion is determined within an image frame is detected.

Meanwhile, the at least one image frame may include a base image frame obtained at timing t, a previous image frame obtained at timing t-z (herein, z is a natural number) that is before the timing t, and a following image frame obtained at timing t+z (herein, z is a natural number) that is after the timing t.

Hereinafter, in the embodiment of the present disclosure, an image frame including the target area that becomes a base of determining displacement information refers to a target frame, and an image frame that becomes a target to which displacement information of the target area is determined refers to a tracking frame. For example, when the target frame is the base image frame, the tracking frame may be the following image frame. Alternatively, when the target frame is the previous image frame, the tracking frame may be the base image frame.

In step S1001, the apparatus for determining atmosphere motion information may determine a target area within the target frame. The apparatus for determining atmosphere motion information may divide the target frame into blocks of a first predetermined size unit (for example, i×j pixel unit), divide the blocks of the first predetermined size unit into blocks of a second predetermined size unit (for example, k×l pixel unit) included in the first size unit and calculate standard deviations of the respective blocks of the second predetermined size unit, and set a block of the first size unit, in which the center point thereof is a block of the second size unit having the largest standard deviation value, as a target area. In addition, the apparatus for determining atmosphere motion information may selectively set an area, in which an object through which an atmosphere motion is determined is present (for example, block of the first size unit), as the target area.

In the present disclosure, a size of the target area may be set the same as the first predetermined size. The present disclosure describes the size of the target area, but it is not limited thereto. It is sufficient for the present disclosure to set the size of the target area to be the same as the second predetermined size or greater.

The method of determining atmosphere motion information according to the embodiment of the present disclosure may determine displacement information of target areas included within a target frame by repeatedly processing steps S1001 to S1004. The apparatus for determining atmosphere motion information according to the embodiment of the present disclosure may sequentially determine and store displacement information of target areas included in a target frame, thus the apparatus for determining atmosphere motion information may store displacement information of another target area that is previously determined before calculating that of a target area. Accordingly, in step S1002, the apparatus may determine displacement information of neighboring target area. In other words, the apparatus for determining atmosphere motion information may determine displacement information of a target area that is positioned adjacent to a target area for which displacement information is determined (in other words, neighboring target area).

For this, in step S1002 according to which displacement information of neighboring target area is determined, the apparatus may perform operations of determining the neighboring target area. The neighboring target area may be set by using any one of a target area that is adjacent to the target area, a target area that is present within a predetermined size range from the target area, a predetermined number of target areas that are positioned closest to the target area, and a target area positioned in an area grouped with the target area.

Next, in step S1003, the apparatus for determining atmosphere motion information may calculate prediction displacement information (for example, (Pred'(x), Pred'(y)) that is predicted displacement information of the target area by using displacement information of the neighboring target area, and set a tracking area of a predetermined size (for example, p×q pixel unit) by using the prediction displacement information (for example, (Pred'(x), Pred'(y)) within a tracking frame. In detail, the apparatus for determining atmosphere motion information may determine coordinates (for example, (Colocation(x), Colocation(y))) of an associated point associated with coordinates (x, y) of the center point of the target area in a tracking frame, and set coordinates (for example, (Search_center_Point(x), Search_center_Point(y))) of a tracking base point by reflecting the prediction displacement information (for example, (Pred'(x), Pred'(y)) on the associated point. In addition, the apparatus for determining atmosphere motion information may set a tracking area of a predetermined size (for example, p×q pixel unit size) and around the tracking base point.

The apparatus for determining atmosphere motion information may determine prediction displacement information by using displacement information of the neighboring target areas. For example, when a first target area and a second target area are present as the neighboring target areas, the apparatus for determining atmosphere motion information may determine the prediction displacement information by calculating a median value (median function) of displacement information ($\Delta x1$, $\Delta y1$) of the first neighboring target area and displacement information ($\Delta x2$, $\Delta y2$) of the second neighboring target area.

Alternatively, the apparatus for determining atmosphere motion information may determine the prediction displacement information by calculating a weighted value on which distances between the target area and the neighboring target areas are reflected. For example, the apparatus for determining atmosphere motion information may determine the prediction displacement information by applying a weighted value $\alpha$ to displacement information ($\Delta x1$, $\Delta y1$) of the first neighboring target area and by applying a weighted value $\beta$ to displacement information ($\Delta x2$, $\Delta y2$) of the second neighboring target area. Meanwhile, the weighted values $\alpha$ and $\beta$ may be set by reflecting distances between the target area that displacement information thereof is determined and the neighboring target areas. For example, the weighted values $\alpha$ and $\beta$ may be values in which distances between the target area and the respective neighboring target areas are set inversely proportional, and may be calculated by using the above formula 3 and by applying the method provided from the disclosure describing the same. In addition, alternatively, the weighted values may be set stepwise considering the distances from the target area, the closer the distance between the target area and the neighboring target area, the larger the weighted value may be applied.

When calculating the prediction displacement information by the apparatus for determining displacement information, a neighboring target area may not be present according to a characteristic of the target area. Herein, the prediction displacement information may be set to be "0". In addition, when a single neighboring target area is present according to a characteristic of the target area, the apparatus for determining displacement information may use the determined displacement information (for example, ($\Delta x1$, $\Delta y1$)) of the neighboring target area as the prediction displacement information (for example, (Pred'(x), Pred'(y))).

In step S1004, the apparatus for determining atmosphere motion information may calculate displacement information (for example, a motion vector) of an area associated with the target area within the tracking area. For example, the apparatus for determining atmosphere motion information may divide the tracking area into blocks of a size unit that is associated with a size of the target area (for example, n×m pixel unit), and calculate cross-correlation coefficients between the target area and the respective divided blocks. In addition, the apparatus for determining atmosphere motion information may determine a block having the optimum cross-correlation coefficient with the target area as a matching block, and determine displacement information (for example, a motion vector) between the target area and the matching block as displacement information (for example, a motion vector) of the target area. In addition, the apparatus for determining atmosphere motion information may store the displacement information of the target area determined as the above operations to be used for determining a tracking area of another target area. Herein, the optimum cross-correlation coefficient may be the largest cross-correlation coefficient value. When the largest cross-correlation coefficient value is in plural, a block positioned closest to the target area may be determined as the block having the optimum cross-correlation coefficient. Although the embodiment of the present disclosure shows operation of determining the optimum cross-correlation coefficient, it is not limited thereto. It is sufficient for the embodiment of the present disclosure to detect the matching block that matches with the target area.

In order to determine atmosphere motion information more accurately, the method of determining atmosphere motion information according to the embodiment of the present disclosure may determine displacement information of target areas within at least two target frames. In order to determine displacement information of the target areas within at least two target frames, in step S1005, the method of determining atmosphere motion information may determine displacement information of the target areas within at least two target frames by repeatedly processing steps S1001 to S1004. For example, the target areas may be set by determining the above base image frame and the previous image frame as target frames. Steps S1001 to S1004 may be processed on the base image frame and the previous image frame that are determined as the target frames.

In step S1006, the apparatus for determining atmosphere motion information may determine altitude information of the target area. Positioned altitude or characteristics of an object through which an atmosphere motion is determined may vary. The apparatus for determining atmosphere motion information may determine the altitude information of the target area by using color temperature of the object through which the atmosphere motion is determined. In addition, the apparatus for determining atmosphere motion information may determine altitude information of clouds or vapour by using luminance temperature of the object through which the atmosphere motion is determined.

Alternatively, the apparatus for determining atmosphere motion information may set the altitude information of the target area by receiving altitude information of a satellite from outside.

In step S1007, the apparatus for determining atmosphere motion information may store and mange atmosphere motion information by using the displacement information and the altitude information of the target area. For example, the apparatus for determining atmosphere motion information may generate atmosphere motion information including the displacement information and the altitude information of the target area. In addition, the displacement information may include first displacement information between the previous image frame and the base image frame and second displacement information between the base image frame and the following image frame. The altitude information may include first altitude information of the previous image frame and second altitude information of the base image frame. Considering this, the atmosphere motion information may include first atmosphere motion information including the first displacement information and the first altitude information, and second atmosphere motion information including the second displacement information and the second altitude information.

Preferably, the apparatus for determining atmosphere motion information may determine effectiveness of the atmosphere motion information. For example, the apparatus for determining atmosphere motion information may determine the effectiveness of the atmosphere motion information by calculating a consistency between the first displacement information and the second displacement information. In other words, the apparatus for determining atmosphere motion information may determine the effectiveness of the atmosphere motion information by using at least one of a wind direction consistency, a wind speed consistency, and a vector consistency. In detail, the displacement information may include a vector size or a vector direction, and the apparatus for determining atmosphere motion information may calculate a wind speed consistency by comparing sizes of two vectors (for example, first vector included in first displacement information and second vector included in second displacement information), and calculate a wind direction consistency by comparing directions of two vectors (for example, first vector and second vector). In addition, the apparatus for determining atmosphere motion information may calculate a vector consistency by comparing two vectors (for example, first vector and second vector). In addition, the apparatus for determining atmosphere motion information may determine a spatial homogeneity by using a final vector that is obtained by calculating an average of the first vector included in the first displacement information and the second vector included in the second displacement information. The spatial homogeneity may be used for determining the effectiveness of the atmosphere motion information.

Preferably, the apparatus for determining atmosphere motion information may apply different weighted values to a wind direction consistency, a wind speed consistency, a vector consistency, and a spatial homogeneity to determine the effectiveness of the atmosphere motion information. For example, the apparatus for determining atmosphere motion information may apply a first weighted value 5 to a wind direction consistency, wind speed consistency, vector consistency and apply a second weighted value to a spatial homogeneity. Herein, the second weighted value may be set to be greater than the first weighted value 5.

The method shown in the present disclosure (in other words, a method of determining displacement information and a method of determining atmosphere motion information) is described as a series of operations for clarity of description, and the order of steps is not limited. When needed, the steps may be performed at the same time or in a different order of steps. In order to implement the method according to the present disclosure, the steps may additionally include other steps, include the remaining steps except for some steps, or may include additional steps other than some steps.

The various embodiments of the disclosure are not intended to be exhaustive of all possible combinations and are intended to illustrate representative aspects of the disclosure. The matters described in the various embodiments may be applied independently or in a combination of two or more.

In addition, the embodiments of the present disclosure may be implemented by various means, for example, hardware, firmware, software, or a combination thereof. In a hardware implementation, an embodiment of the present disclosure may be implemented by one or more ASICs (Application Specific Integrated Circuits), digital signal processors (DSPs), digital signal processing devices (DSPDs), programmable logic devices (PLDs), field programmable gate arrays (FPGAs), processors, controllers, microcontrollers, microprocessors, etc.

The scope of the present disclosure includes a software or machine-executable instructions (for example, operating system, applications, firmware, programs, etc.) that enables operations the methods according to the various embodiments to be performed on a device or computer, and a non-transitory computer-readable medium in which such software or instructions are stored and are executable on a device or computer.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of determining displacement information, the method comprising:
    setting a target area within a target frame in which an object is positioned to determine displacement information of the target area;
    determining a tracking area in a tracking frame based on displacement information of at least one neighboring target area of the target area, the at least one neighboring target area being assigned a value based on a respective distance to the target area;
    determining a matching area in the tracking area that matches the target area and determining the displacement information of the target area according to the matching area determined.

2. The method of claim 1, wherein the setting of the target area includes:
    dividing the target frame into blocks of a first predetermined size unit,
    dividing the blocks of the first predetermined size unit into blocks of a second predetermined size unit and calculating standard deviations of the blocks of the second predetermined size unit, respectively, the second predetermined size unit being set to be smaller than the first predetermined size unit, and
    setting a block among the blocks of the first predetermined size unit around a block among the blocks of the second predetermined size unit that has an optimal standard deviation to the target area.

3. The method of claim 1, wherein the target area includes an area in which the object is included among blocks of a first predetermined size unit included in the target frame.

4. The method of claim 1, wherein the determining of the tracking area includes:
    determining the displacement information of the at least one neighboring target area, determining prediction displacement information by using the displacement information of the at least one neighboring target area, and determining the tracking area by applying the prediction displacement information to a center point of the target area.

5. The method of claim 4, wherein the value assigned to the at least one neighboring target area is a median value and the determining of the prediction displacement information includes:

calculating the median value of the displacement information of the at least one neighboring target area.

6. The method of claim 4, wherein the value assigned to the at least one neighboring target area is a weighted value and the determining of the prediction displacement information includes:

applying the weighted value in which the respective distance between the target area and the at least one neighboring target area is reflected.

7. An apparatus for determining displacement information, the apparatus including:

one or more hardware processors configured to:
set a target area within a target frame in which an object is positioned to determine displacement information of the target area, and
determine a tracking area in a tracking frame based on displacement information of at least one neighboring target area of the target area, the at least one neighboring target area being assigned a value based on a respective distance to the target area, and
determine the displacement information associated with the target area in the tracking area.

8. The apparatus of claim 7, wherein the one or more hardware processors is further configured to:

divide the target frame into blocks of a first predetermined size unit,
divide the blocks of the first predetermined size unit into blocks of a second predetermined size unit and calculate standard deviations of the blocks of the second predetermined size unit, respectively, and
set a block among the blocks of the first predetermined size unit that is around a block among the blocks of the second predetermined size unit that includes an optimum standard deviation to the target area.

9. The apparatus of claim 7, wherein the one or more hardware processors is further configured to:

store and manage the displacement information of the target area,
determine the displacement information of the at least one neighboring target area, determine prediction displacement information by using the displacement information of the at least one neighboring target area, and determine the tracking area by applying the prediction displacement information to a center point of the target area, and
determine the displacement information of the target area by determining a matching area that matches with the target area within the tracking area.

10. The apparatus of claim 9, wherein the value assigned to the at least one neighboring target area is a median value, and the one or more hardware processors is further configured to determine the prediction displacement information by calculating the median value of the displacement information of at least one neighboring target area.

11. The apparatus of claim 9, wherein the value assigned to the at least one neighboring target area is a weighted value, and the one or more hardware processors is further configured to determine the prediction displacement information by applying the weighted value in which the respective distance between the target area and the at least one neighboring target area is reflected.

12. A method of determining atmosphere motion information, the method comprising:

setting a target area used, in a target frame, to determine atmosphere motion information;
determining a tracking area in a tracking frame based on displacement information of a neighboring target area of the target area;
tracking a matching area in the tracking area that matches with the target area and determining displacement information of the target area according to the matching area being tracked;
determining altitude information of the target area; and
determining the atmosphere motion information by reflecting the displacement information and the altitude information of the target area.

13. The method of claim 12, wherein the determining of the target area includes:

dividing the target frame into blocks of a first predetermined size unit,
dividing the blocks of the first predetermined size unit into blocks of a second predetermined size unit and calculating standard deviations of the blocks of the second predetermined size unit, respectively, the second predetermined size unit being set to be smaller than the first predetermined size unit, and
setting a block among the blocks of the first predetermined size unit that is around a block among the blocks of the second size unit that includes an optimum standard deviation to the target area.

14. The method of claim 12, wherein the determining of the tracking area includes:

determining the displacement information of the neighboring target area,
determining prediction displacement information by calculating a median value of the displacement information of the neighboring target area; and
determining the tracking area that is around a point at which the prediction displacement information is reflected on a center point of the target area.

15. The method of claim 12, wherein the determining of the tracking area includes:

determining the displacement information of the neighboring target area,
determining the prediction displacement information by applying a weighted value in which a distance between the tracking area and the neighboring target area is reflected, and
determining the tracking area by applying the prediction displacement information to a center point of target area.

* * * * *